(12) United States Patent
Forrester

(10) Patent No.: US 8,064,959 B2
(45) Date of Patent: *Nov. 22, 2011

(54) COMMUNICATION DEVICE WITH DIVERSITY ANTENNA

(75) Inventor: Timothy Forrester, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 409 days.

This patent is subject to a terminal disclaimer.

(21) Appl. No.: 12/119,160

(22) Filed: May 12, 2008

(65) Prior Publication Data

US 2008/0214243 A1    Sep. 4, 2008

Related U.S. Application Data

(63) Continuation of application No. 10/665,961, filed on Sep. 18, 2003, now Pat. No. 7,383,063.

(51) Int. Cl.
*H04M 1/00* (2006.01)

(52) U.S. Cl. .................. 455/562.1; 455/561; 455/575.7

(58) Field of Classification Search ............... 455/277.1, 455/561, 562.1, 575.7
See application file for complete search history.

(56) References Cited

U.S. PATENT DOCUMENTS

| | | | |
|---|---|---|---|
| 5,189,434 A * | 2/1993 | Bell | 343/853 |
| 5,940,454 A | 8/1999 | McNicol et al. | |
| 6,018,651 A * | 1/2000 | Bruckert et al. | 455/277.1 |
| 6,021,317 A * | 2/2000 | Irvin | 455/78 |
| 6,072,996 A * | 6/2000 | Smith | 455/189.1 |
| 6,496,150 B1 * | 12/2002 | Li et al. | 343/702 |
| 6,768,464 B1 | 7/2004 | Shoji et al. | |
| 6,826,410 B2 * | 11/2004 | Simonsson et al. | 455/506 |
| 6,862,618 B1 | 3/2005 | Gray et al. | |
| 6,993,303 B2 * | 1/2006 | Kwun | 455/136 |
| 7,043,218 B1 | 5/2006 | Ogino | |
| 7,139,324 B1 * | 11/2006 | Ylitalo et al. | 375/267 |
| 7,260,416 B2 * | 8/2007 | Shippee | 455/552.1 |

* cited by examiner

*Primary Examiner* — Tuan H Nguyen

(57) ABSTRACT

A method and apparatus is disclosed for improving signal reception in a wireless communication device by selectively processing one of two or more signals received over two or more antennas that are configured at least partially orthogonal. In one embodiment, the signal source selection is based on comparison of a signal error rate to a threshold value. Error rates in excess of the threshold value may initiate a switching apparatus to selectively enable signal reception from a different antenna to improve the error rate. In one embodiment, amplifiers are located between the switching apparatus and the two or more antennas to thereby reduce noise. In an alternative embodiment control signals selectively enable and disable the amplifiers to control signal reception.

19 Claims, 8 Drawing Sheets

COMMUNICATION DEVICE WITH DIVERSITY ANTENNA

RELATED APPLICATIONS

This application is a continuation application of U.S. patent application Ser. No. 10/665,961 entitled "COMMUNICATION DEVICE WITH DIVERSITY ANTENNA", filed on Sep. 18, 2003 now U.S. Pat. No. 7,383,063 and incorporated by reference herein.

FIELD OF THE INVENTION

This invention relates generally to wireless communication and in particular to a communication device having one or more antennas and a method utilizing the one or more antennas.

BACKGROUND

Wireless devices are playing an increasingly significant role as a communication tools throughout the world. Examples of wireless communication devices include portable radios, cellular or wireless telephones, pagers, electronic messaging devices, and the like. As the cost of ownership of wireless communication devices has become more affordable, such devices have become a necessity for many people.

Today, there are over 123 million wireless mobile phone subscribers in the United States alone. Because of the increased use and dependence of wireless communications throughout the world, being able to communicate to others irrespective of one's location is of critical importance. Two factors may affect a subscriber's ability to utilize wireless communication network. First, the coverage of the network, which is a function of the number of base stations and second, the ability of the subscriber's wireless communication device to receive the signal.

One drawback of existing wireless communication devices is an inability to effectively receive an incoming voice or data signal. To achieve reception, the incoming electromagnetic signal is picked up by an antenna, which is responsible for transmitting and receiving the modulated carrier signal that contains the desired signal (voice or data) information. The wireless communication device's ability to capture, demodulate, and decode the received signal will depend on a number of factors, such as the signal strength and nearby signal obstructions.

For example, existing wireless communication devices may have difficulty receiving a signal in the presence of tall structures, such as buildings found in metropolitan environments. In such environments, the original signal is often cluttered with replicas of the original signal that are weaker in amplitude. This often causes problems in reception as it becomes difficult for the discriminator of the mobile communications device to detect the original signal.

Furthermore, there are changing environmental factors such as precipitation and terrain that could affect the signal strength or create signal reflections, and hence affect the wireless communication device's ability to receive the signal. In addition, dead spots encountered in mountainous or wooded areas can block or weaken signals and are a serious drawback to wireless communication.

The drawbacks mentioned above are factors which contribute to a reduction of the signal to noise ratio (SNR) of a signal provided to a transceiver of the wireless communication device. This correlates to an increase in a symbol or bit error rate of a demodulated baseband digital signal. When receiving voice information, these above-mentioned drawbacks may result in a decrease in perceived speech quality. In the case of data, the net result may be significant packet loss due to bit errors. As a result, there exists a need for a method and apparatus to more effectively capture and process the signal at the wireless mobile communication device.

SUMMARY

As discussed above, communication devices based on prior art designs may suffer from poor reception when presented with signal reception challenges. The method and apparatus described herein overcomes the drawbacks of the prior art by introducing two or more antennas having different signal reception properties or capabilities into a wireless communication device. In one embodiment the antennas are configured at least partially orthogonal to each other to thereby improve signal reception. Selection as to which antenna's signal to utilize as the received signal may be based on signal analysis. For example, during device operation, a processor or other control device may calculate the error rate of the incoming signal and compare the error rate to a threshold value. Based on the comparison between the error rate and a threshold value, the system may process a signal from a different antenna.

In one embodiment a control signal modifies a switch setting to selectively provide a signal, selected from two or more signals received over the two or more antennas, to the processing apparatus of the communication device. A processor or other control system may generate the control signals.

One or more control algorithms may be enabled to refine the signal selection process to reduce or eliminate hunting between antennas. One potential algorithm implements a time delay between switching events. Other algorithms may require that after a switching event the error rate must surpass a second threshold value before another switching event will occur. It is contemplated that multiple threshold values may exist depending on previous signal selection and error rate history.

In one embodiment an amplifier is located prior to the switching device to reduce the impact of passing the signal through the switching device. By amplifying the signal prior to switching, the degradation in the signal to noise ratio resulting from the switching device is reduced. Thus, any additional noise introduced by the switch is reduced.

It is further contemplated that the amplifiers may be selectively enabled or disabled to control which antenna's output is provided to the communication device processing system. In such an embodiment, the drawbacks associated with a switching device are eliminated.

The method and apparatus described herein possess numerous advantages over the prior art. One such advantage is improved signal reception. In instances when the signal is weak, reflected, or received in a manner making reception by the antenna difficult, the dual and partially orthogonal antenna arrangement provides improved reception. Another advantage is an improved signal to noise ratio in embodiments that eliminate the switching device. Alternatively, the switching device may be located, in relation to an amplifier, in a manner that minimizes noise.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention.

DETAILED DESCRIPTION

A method and apparatus is provided for providing a more robust signal to a receiver in a wireless communication device. The method and apparatus may be implemented in a wide variety of wireless environments, such as wireless telephones, base stations, radios, desktop computers, intercom systems, surveillance systems, alarm systems, mobile messaging devices, pagers, personal digital assistants, and the like. In the following description, numerous specific details are set forth in order to provide a more thorough description of the present invention. It will be apparent, however, to one skilled in the alt, that the present invention may be practiced without these specific details. In other instances, well-known features have not been described in detail so as not to obscure the invention.

Figure 1:
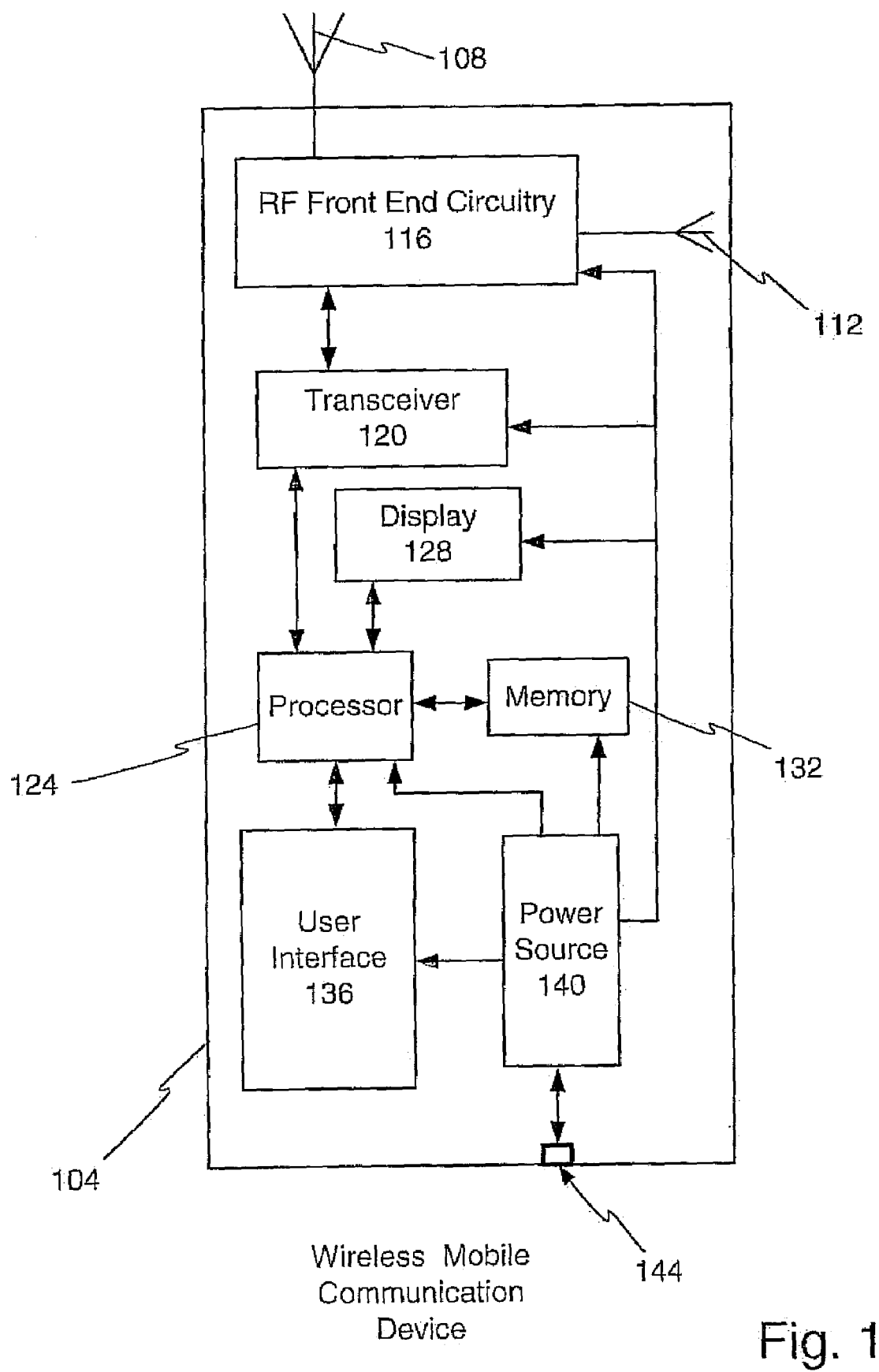
FIG. 1 illustrates a block diagram of a wireless communication device.

FIG. 1 illustrates a block diagram of an example environment for use of the method and apparatus described herein. This is but one example environment and it is contemplated that other environments of use would benefit from the principles of the invention. The example environment shown in FIG. 1 comprises a wireless communication device 104. The wireless communication device 104 comprises a first antenna 108 and a second antenna 112 configured to receive a wireless signal. In one embodiment the antennas 108, 112 receive a carrier signal with voice or data information modulated or coded within the carrier signal. Examples of wireless mobile communication devices include cellular/PCS telephones, pagers, electronic messaging/e-mail devices, wireless Personal Digital Assistants (PDA), wireless Internet appliances, and the like.

The antennas 108, 112 are connected to RF front-end circuitry 116 as shown in FIG. 1. In one embodiment, the first antenna 108 comprises a whip antenna and the second antenna 112 comprises an internal antenna not visible to the user of the wireless communication device. The antennas 108, 112 may comprise any component that is capable of collecting or radiating electromagnetic waves from the environment. The antennas 108, 112 may be designed to operate over a particular range of frequencies. The size and shape of the antennas 108, 112 may dictate it's frequency, rain, and radiation and reception characteristics. Examples of different antennae include whip, omni, dipole, corner reflector, horn, helix, patch, Yagi, parabolic dish, and panel.

A transceiver 120 connects to the RF front end circuitry 116. The transceiver 120 detects, processes, and filters a carrier wave to generate a signal that can be further processed by processor circuitry 128. In addition, the transceiver 120 may perform the reverse function when in transmit mode by modulating a source signal to an appropriate carrier wave frequency and transmitting the modulated signal through the RF front-end circuitry 116 and the antenna. The transceiver 120 may comprise a modulator, demodulator, frequency synthesizers, filters, and other devices or systems designed to receive and transmit signals.

The processor 124 connects to the transceiver 120, a display 128, a memory 132, and a user interface 136. The processor 124 comprises one or more integrated circuits that functions as the central processing unit of the wireless communications device 104. The processor 124 functions may comprise baseband digital signal processing, voice compression/decompression, speech synthesis of the data stream, and the generation of control signals to the RF front-end circuitry. Other functions of the processor 124 comprise supporting the display 128, the user interface 136, and the memory 132.

The display 128 provides visual information to the user of the wireless communication device. The display 128 may provide information to the user regarding the current status of the wireless communication device. In one embodiment, the display comprises a liquid crystal display (LCD). In another embodiment, the display comprises light emitting diodes (LED). It is contemplated that the display 128 could also comprise an active or passive matrix display. The display 128 may electrically communicate to a device that emits audible signals to alert the user of an event.

The memory 132 may comprise a flash memory, random access memory, read only memory, or a hard disk drive (such as a micro-drive). The memory 132 may contain data configured by the manufacturer or contain data that is input by the user, such as data that is specific to the user of the wireless communications device. For example, the memory 132 provides the flexibility to expand a wireless communication device's features with services such as storage of a user's phone directories, preferred roaming codes, voicemail, or other information.

The user interface 136 comprises a device that allows the user to input data into the wireless communications device 104. This data may be used to control the operation of the wireless mobile communication device 104. A possible embodiment of the fuser interface 136 is a tactile keypad. It is contemplated that in another embodiment, the user interface 136 comprises a voice recognition system.

The power source 140 provides power to the electronic components of the wireless communication device 104. The power source 140 may obtain power through an input power jack 144. The power source 140 may comprise a disposable or a rechargeable energy storage device such as for example a battery. In the event the power source 140 is rechargeable, the power source may be charged through the use of the power jack 144. In other embodiments, it is contemplated that the power source 140 may be charged through solar cells. The power jack 144 comprises a connector for delivering power from an external source. Examples of external sources include independent power supplies, voltage sources from a wall jack, automobile DC adapters, and the like.

Figure 2:
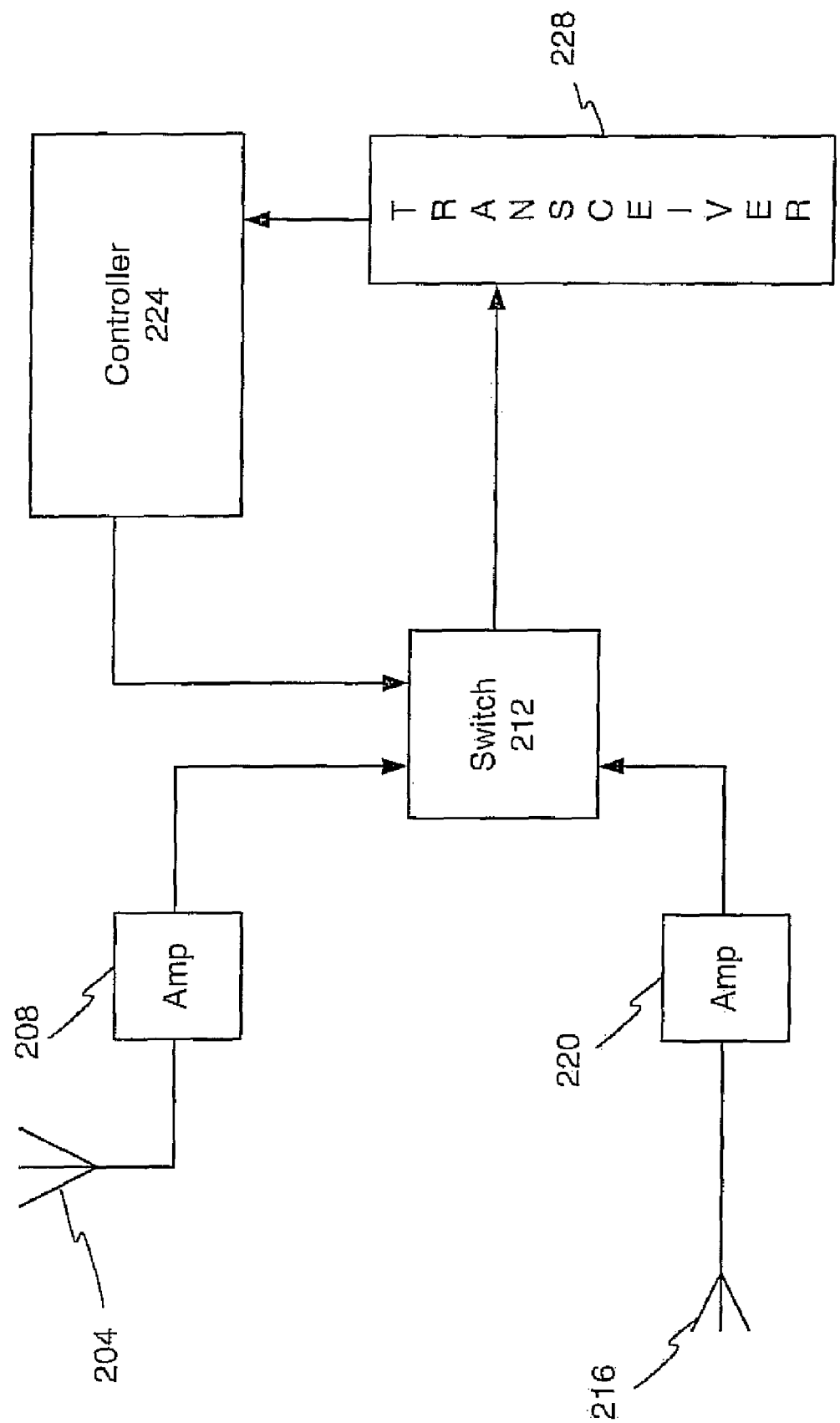
FIG. 2 illustrates a block diagram of an example embodiment of the invention.

FIG. 2 is a block diagram of an example embodiment of the invention. In general, the method and apparatus disclosed herein provides a diversity antenna approach to the signal reception including an amplifier located between an antenna and the two or more antennas. As a result of the diversity antenna approach, signal reception is improved over single or non-diverse multiple antenna systems. Location of the amplifier prior to the switching element provides the advantage of a better signal to noise ratio (SNR) than compared to the systems prior art.

As shown in FIG. 2, a first antenna 204 connects to the input of a low noise amplifier 208. The output of the low noise amplifier 208 connects to a switch 212. The low noise amplifier 208 receives the signal output from the antenna 204 and amplifies the signal to a suitable power level for transmission to the switch 212. A second antenna 216 connects to the input of a low noise amplifier 220. The output of the low noise amplifier 220 connects to the input of the switch 212. The switch 212 connects to a transceiver 228, which in turn connects to a controller 224.

The switch 212 is controlled by the controller 224 to provide the signal received from the first antenna 204 or the second antenna 216 to the transceiver 228. At the transceiver 228 the signal is processed and demodulated to baseband. The transceiver 228 may output the demodulated baseband signal into the controller 224 or the controller may simply tap into the transceiver. Either the transceiver 228 or the controller 224 may analyze the signal to determine a signal to noise ratio, a bit error rate or a symbol error rate. As a result of this error analysis, the controller 224 may output control signal(s) to the switch 212. In response to the control signals, the switch 212 may select the output from either antenna 204, 216 to couple to the transceiver 228.

It is contemplated that various switch control algorithms may be adopted to determine switch decisions. In one embodiment the error rate is monitored on an ongoing basis. As the error rate reaches a threshold or is maintained above an undesirable level for a sufficient period of time, the controller 224 may toggle the switch 212 via a control signal. The threshold need not be a fixed number. Depending on the algorithm, the threshold may be made adaptive to better match the radio propagation environment. The portion of the transceiver 228 responsible for receiving the signal and the controller 224 may be collectively referred to as the receiver. The controller 224 and transceiver are shown as separate elements for purposes of discussion. It is fully contemplated that the controller 224 and transceiver 228 functions may be combined into a single device.

Antenna 204, 216 can be designed, spatially positioned, or configured to be orthogonal or partially orthogonal to each other. As an example, the two antenna 204, 216 may be orthogonally polarized. When antennas are orthogonal or partially orthogonal, a received signal may be more effectively captured by one of the antennas than the other. This may occur when the correlation of an electromagnetic field directional vector of the received signal with a directional vector associated with the polarization plane of the first antenna 204 is greater than the result from correlation to the second antenna 216. Overall, the inclusion of an additional antenna 216 provides a "diversity" approach to improving the reception of an electromagnetic wave by providing an alternate signal source. Although shown with two antennas, it is contemplated that more than two antennas may be utilized to further improve reception.

As a further advantages to the system shown in FIG. 2, the signal is amplified by the low noise amplifiers 20, 220 prior to passing through the switch 212. There is an advantage associated with amplifying the signal prior to switching in that the magnitude of the signal, in relation to noise, presented to the transceiver 228 is greater when the signal is amplified prior to switching because the attenuation introduced by the switch is a lower percentage of the total signal magnitude. In contrast, when the switching occurs prior to amplification, the noise levels associated with the signal are increased. As a result, amplifying the signal prior to executing a switching operation results in better reception properties for the wireless communication device.

This relationship is illustrated by the following equation:

$$N=KT_cB$$

where N represents the noise introduced by an element or group of elements, k represents Boltzmann's constant i.e. $\sim 1.38 \times 10^{-23}$, $T_c$ represents a composite noise temperature and B represents an effective bandwidth. The composite noise temperature is based on the contribution of noise by the combination of a lossy component and an amplifier. Hence $T_c$ may be expanded as:

$$T_c = T_{amp} + T_{swch}$$

such that $T_{amp}$ represents the composite noise of the amplifier and $T_{swch}$ represents the composite noise of the switch.

To illustrate the benefits of one aspect of the method and apparatus describe herein, two different switch and amplifier configuration are analyzed. In a first configuration and as contemplated herein, the signal is first amplified and then fed into a switching element. The composite noise of the arrangement may be represented as above, such that:

$$T_c = T_{amp} + T_{swch}$$

where $T_{amp}$ represents the composite noise of the amplifier and $T_{swch}$ represents the composite noise of the switch. In a second configuration, the signal first passes through a switching element and is thereafter amplified. The composite noise of the arrangement may be represented as above, such that:

$$T_c = T_{swch}[L_{swch} \times T_{amp}]$$

such that $T_{amp}$ represents the composite noise of the amplifier, $T_{swch}$ represents the composite noise of the switch, and L represents a value greater than one that is associated with noise introduced by the switch. As can be appreciated, the resulting noise introduced into the signal is less when the signal is first amplified and then switched.

Figure 3:
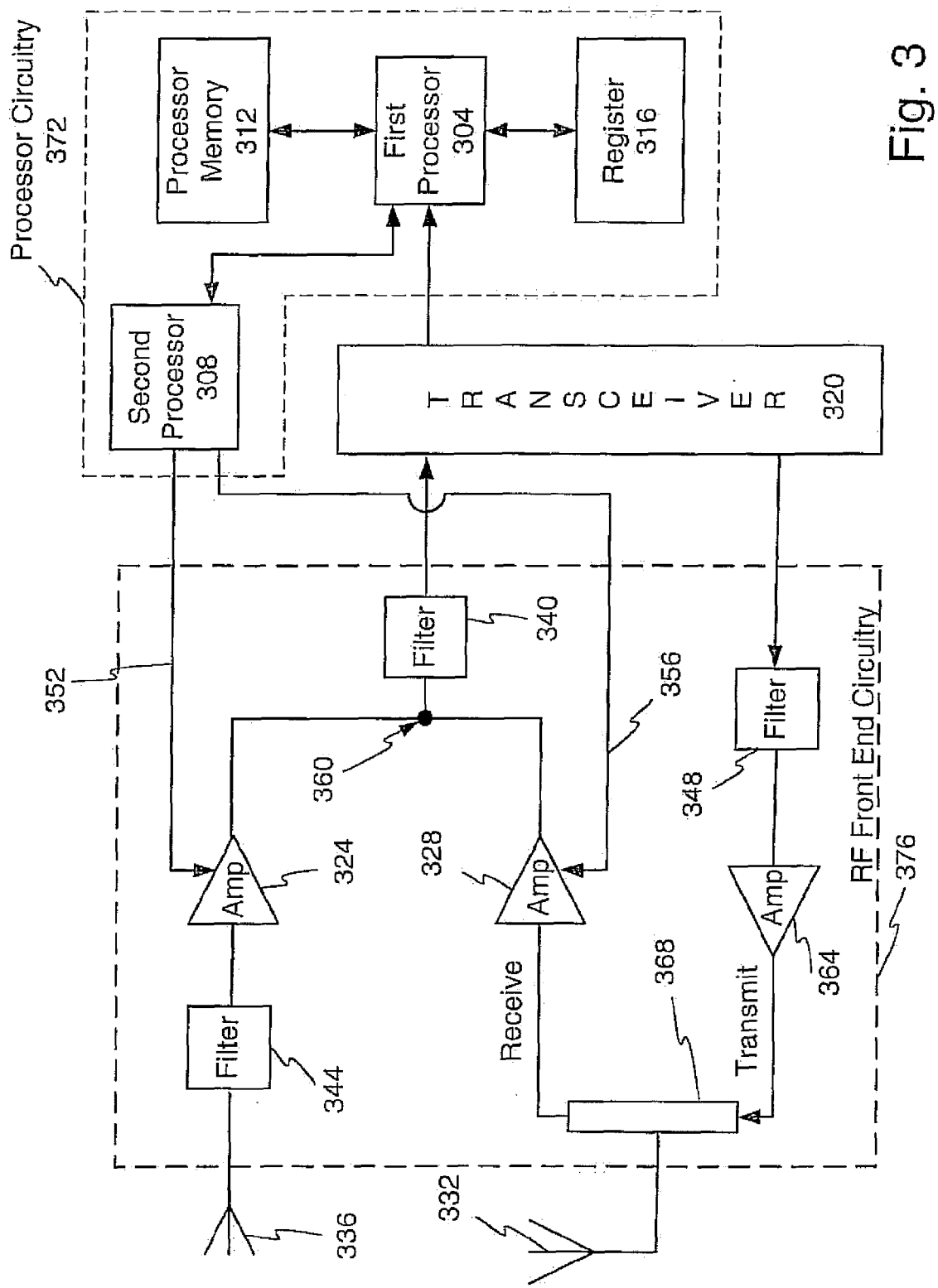
FIG. 3 illustrates a detailed block diagram of an example embodiment of an example implementation of the invention.

FIG. 3 comprises an example implementation of one embodiment of the method and apparatus described herein. In general, FIG. 3 illustrates a first antenna 336 and a second antenna 332 connected to a RF front-end circuitry 376. The RF front-end circuitry 376 communicates with processor circuitry 372 and a transceiver 320. These apparatus are described below in greater detail.

The first antenna 332 may comprise an external antenna typical to a wireless mobile communication device while a second antenna 336 may comprises an additional small internal antenna within the wireless communication device. The first antenna 332 connects to the input of a duplexer 368. The first antenna 332 receives the carrier signal that is subsequently provided to a duplexer 336. The duplexer 368 is a device that uses tuned circuits to isolate the transmitted frequencies from the received frequencies. The duplexer 368 isolates the received signal and then sends it to the low noise amplifier 328. The low noise amplifier 328 amplifies the received signal to an appropriate voltage. The output of the low noise amplifier 328 connects to a signal node 360.

The second antenna 336, provides an additional device receiving for the signal. The second antenna 336 may be configured to be orthogonal to the first antenna 332. As a result, the embodiment as shown in FIG. 3 provides an alternate path for the received signal to reach the transceiver 320. The output of the second antenna 336 connects to the input of a filter 344. The filter is configured to selectively accept only the frequency band of interest. The filter output connects to a low noise amplifier 324 which is configured to amplify the received signal to an appropriate voltage. The output of the low noise amplifier 324 connects to the signal node 360.

A filter 340 is connected to the signal node 360 to receive and filter the output of the amplifiers 324, 328. The output of the fitter 340 feeds into a transceiver 320. The transceiver 320 comprises a device configured to process a signal upon reception and prior to transmission. The transceiver 320 connects to the filter 340, processing circuitry 372, and a transmit path. Regarding the transmit path of the RF front-end 376, the transceiver 320 connects to a filter 348 which in turn connects to a power amplifier 364.

In operation, the transmitter aspects of the transceiver 320, outputs the transmitted signal to the filter 348. The filter 348 rejects certain frequency bands and in turn passes a filtered signal to a amplifier 364. The amplifier 364 adjusts the signal to an appropriate voltage level for transmission. The output of the amplifier 364 connects to the duplexer 368, which functions as described above. The duplexer 368 provides the signal to the first antenna 332. The filters 340, 344, 348 remove the unwanted frequencies outside of each filters' passband, thereby reducing the noise component of the received signal.

In the embodiment shown in FIG. 3, processor circuitry 372 is included to perform analysis on the received signal and, based on the analysis, control operation of the amplifiers 324, 328. In reference to the processor circuitry 372, a first processor 304 connects to a register 316, a processor memory 312, and a second processor 308. In one embodiment the first processor 304 is configured to analyze the signal to determine the signal quality or other parameter of the received signal. It is contemplated that any parameter regarding the received signal may be analyzed, including but not limited to a bit error rate, a symbol error rate and a signal to noise ratio The register 316 may be configured to store prior error rates or error values or a threshold value. The processor memory 312 may contain software code comprising an algorithm, which is described in more detail below. The second processor 308 may be configured to generate and output control signal to the low noise amplifiers 324, 328 located in an RF front end circuitry 376. The processors 304, 308 may comprise any type processor, control logic, DSP, ASIC, ARM or other device capable of determining an incoming signal's error rate and selecting between two or more received signals to minimize an error rate.

In operation, the processor circuitry 372 is configured to provide either the signal received from the first antenna 332 or the signal received from the second antenna 336 to the transceiver 320 by controlling the amplifiers. The first processor 304 analyzes the signal received from the transceiver 320 and make a determination regarding the quality of the signal. Responsive to control signals generated by the second processor 308 and provided via conductors 352 and 356, the amplifiers 324, 328 amplify either the signal received by the first antenna 332 or the signal received by the second antenna 336. In one embodiment the control signals on conductors 352, 356 selectively disable one of the low noise amplifiers while concurrently enabling the other amplifier. For example, if the control signal on conductor 352 is disabling operation of amplifier 324, then the control signal on conductor 356 may be concurrently enabling amplifier 328. As a result, the signal from the second antenna 336 is no longer provided to the transceiver 320 while the signal from the first antenna 336 becomes the primary signal. It is contemplated that a signal selection algorithm or other control routine is responsible for the decision process. In one embodiment, the algorithm is embodied in machine readable code, such as software code, and is stored in the processor memory 312 of the processor circuitry 372.

In one embodiment, the signal selection algorithm measures the signal quality such as the symbol error rate (SER) or data error rate of the received signal such as by analyzing the signal delivered by the transceiver 320 to the processor circuitry 372. The transceiver 320 may interface with the first processor 304 as illustrated above. It is contemplated that this algorithm can be programmed into the processor memory 312 enabled in hardware.

In another embodiment the signal selection algorithm tracks the trend of the current signal to determine if it is increasing or decreasing in strength. If the trend indicates a decreasing signal strength and it is approaching the unacceptable threshold, then the algorithm would likely switch to the alternate rx path.

The following discussion represents one possible exemplary method of operation of the signal selection algorithm. When the wireless communication device is first turned on, the device can be programmed to commence reception via either of the first antenna 332 or via the second antenna 336. When initial operation commences with the first antenna 332, the received signal travels through a first conductive path, i.e., a first path, defined by the two endpoint elements—the antenna 332 and the node 360. Similarly, a second conductive path, can be defined by the two endpoint elements—the second antenna 336 and the node 360.

When a particular signal quality parameter, such as the symbol error rate (SER), rises above a specified threshold defined as the variable THR1, the processor circuitry 372, by way of the control signals carried on conductors 352, 356, may initiate a transition whereby the signal is received from the second conductive path instead of the first conductive path. If the SER does not exceed the threshold THR1, then reception continues through the first conductive path, i.e. the first antenna 332.

In one embodiment the signal selection algorithm may have an additional variable, such as a time duration, T, during which the SER is monitored. If the SER is within an undesirable range SER>THR1 for a time duration greater than time duration T, then a signal from an alternative path may be selected for use. For example, the signal selection algorithm may transition to a different signal when the SER exceeds the value THR1 for at least T seconds. Stated another way, transition occurs when SER>THR1 and the time duration of SER>THR1 is greater than time T. It is contemplated that based on these principles, one of ordinary skill in the art will understand that other methods of operation are possible.

In the case where reception initially occurs via the internal antenna 336, the SER of the received, signal may also trigger a similar transition. When the SER rises above a specified threshold THR2, the processor circuitry 372, by way of the control signals 352, 356, may initiate a transition to receive the signal via a different antenna. The signal selection algorithm may have as a variable, such as a duration of time, T2, in which the SER is within an undesirable range (SER>THR2). For example, the algorithm may perform this transition when the SER exceeds the value THR2 for at least a time period T2. It should be noted that THR1 and THR2 may be equal or different in value and T1 and T2 may be equal of different in value.

In the embodiment pictured in FIG. 3, it is contemplated the transition from the first antenna 332 path to the second antenna 336 path and vice-versa, occurs in a gradual fashion to reduce transient voltages that could affect the electrical performance of the circuitry or induce an excessive phase step in the signal which result in a demodulation error. It is contemplated that this gradual transition occurs by slowly varying the amplitude of the voltages of the control signals on conductors 352, 356. In one embodiment the control signals on conductors 352, 356 are tied to the appropriate voltage supply inputs through additional circuitry (such as buffer drivers) to the low noise amplifiers 324, 328. By gradually increasing one of the supply voltages, over a period of typically a few milliseconds, while decreasing the other, it is contemplated that one of the low noise amplifiers 324, 328 is gradually turned on while the other low noise amplifier 324, 328 is gradually turned off. As illustrated in FIG. 3, the outputs of the low noise amplifiers 324, 328 are tied to the node 360. Hence, as one low noise amplifier 324 328 turns off the output of this amplifier will appear to be an open circuit, allowing the other low noise amplifier to provide a received signal to the input of the transceiver 320.

It is desired that the transitioning of the supply voltages is accomplished in a gradual manner such that the input to the transceiver 320 and the surrounding circuitry is unaffected by any transient voltage spikes. The overall result of this method and apparatus enables the wireless communication device to receive the desired signal from an alternate path originating from an orthogonally configured antenna 332, 336 in an effort in increase the quality of the received signal without interfacing with signal reception.

FIG. 3 also offers the added benefit in that the signal loss associated with filter 344 is typically less than the receive path loss associated with duplexer 368. This means that the auxiliary receive path from antenna 336 will have a performance advantage in its own right. Thereby improving receive performance still further.

Figure 4:
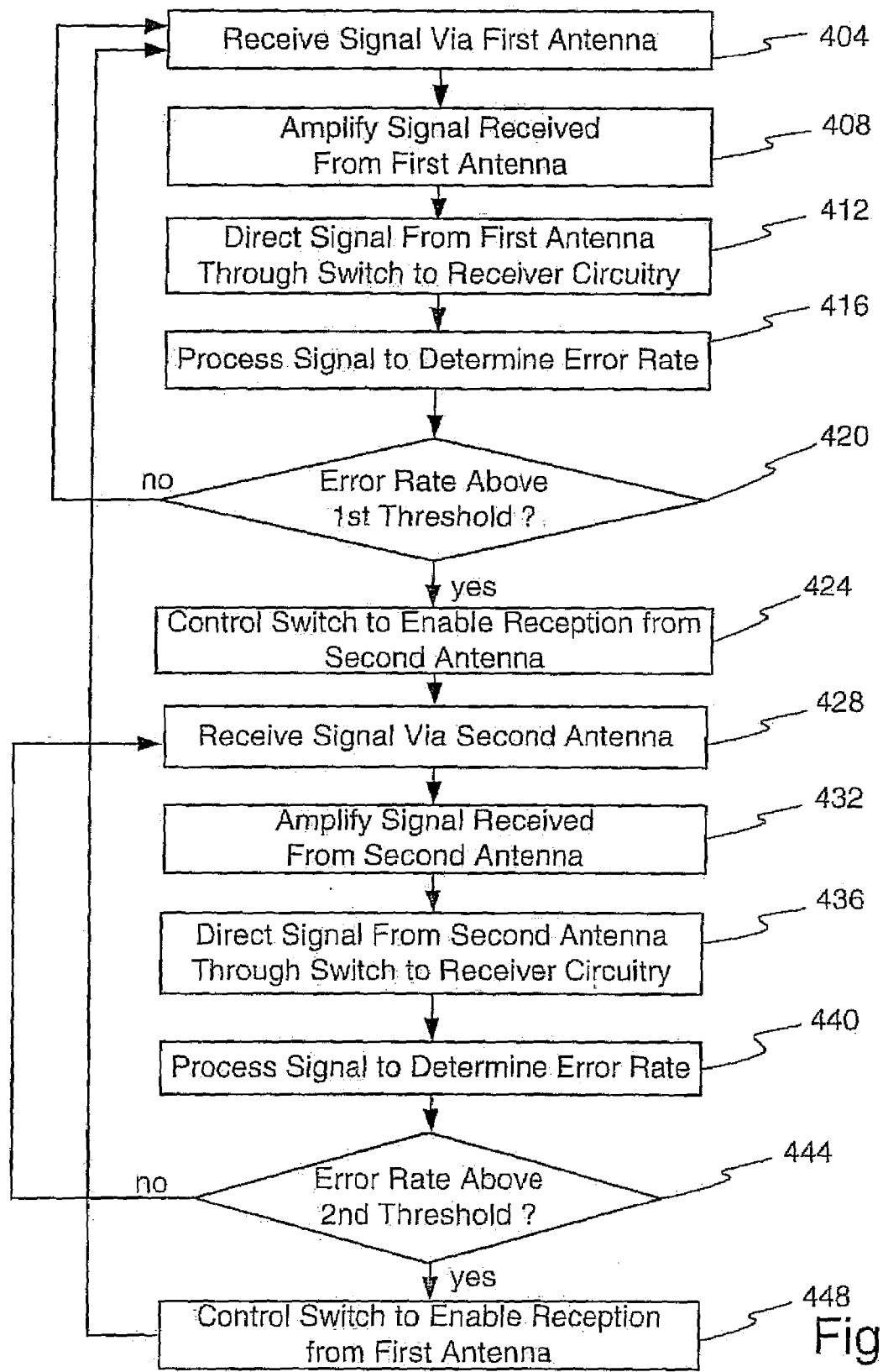
FIG. 4 illustrates an operational flow diagram of an example method of signal selection.

FIG. 4 illustrates an operational flow diagram of an example method of operation. It should be understood that this is one of several methods of operation that may be implemented for the apparatus described herein and that variations of the described algorithm can be implemented without departing from the scope of the claims that follow. At a step 404, a first antenna receives a wireless signal. Any type signal may be received. Thereafter, at a step 408, the front-end circuitry filters and amplifies the signal. Various types of amplification or filtering may occur depending on the particular configuration of the wireless communication device and the frequency band in which the signal of interest is located.

Next, at a step 412, a switch or other signal control device directs the signal from the first antenna through to the receiver circuitry. In one embodiment the receiver circuitry comprises a transceiver with an associated processor. As an advantage of the method and apparatus described, the received signal is amplified prior to passing through a switch. As a signal pass through a switch it is attenuated, amplifying the signal prior to passage through a switch achieves a better signal to noise ratio than if tie amplification occurs after the signal passes through a switch.

At a step 416, the signal is directed to processor circuitry where a particular signal quality parameter, such as SER, can be determined. In other embodiments a bit error rate (BER) or any other error rate or signal reception parameter may be determined. Any manner of error calculation or error representation is contemplated.

In one embodiment, the processor circuitry compares the error rate, such as an SER, to a threshold and then applies a signal selection algorithm. The following discussion represents one possible exemplary algorithm. The threshold at which a transition from the first antenna will occur may be represented as a value THR1. In this configuration, the processor circuitry samples the signal over time and calculates a running average, defined as $SER_{avg}$ over a specified time period, T1, which commences at the instant the SER falls above THR1. If the average symbol error rate $SER_{avg}$ over the time interval T1 is less than or equal to THR1, the system continues reception via the first antenna. Accordingly, if at step 420, the $SER_{avg}$ is less than or equal to SER1 over the time interval T1., then the operation returns to step 404 and operation continues in the manner described above.

Alternatively, if at step 420 the average error over time is greater than THR1, the operation advances to step 424 wherein processor circuitry controls a switch or other switching device to enable reception from the second antenna. Any type switch or switching device may be utilized as described herein to control whether the signal received from a first antenna or a second antenna is provided to the transceiver. In addition it is contemplated that more than two antennas may be utilized to further improve signal reception capability.

Thereafter, at a step 428, the operation receives the signal via the second antenna and at a step 432 amplifies the signal received from the second antenna. Next, at a step 436, the amplified signal received via the second antenna is directed through the switch to the receiver (receive portion of transceiver) circuitry. At the receiver circuitry, the error rate is determined. This occurs at a step 440. Any manner of error calculation or error representation is contemplated. In one embodiment, the processor circuitry computes the error rate, such as an SER and comparers the error rate, to a threshold. The threshold values utilized when receiving from the second antenna may be identical to or differ from the threshold utilized for reception with the first antenna. For purposes of discussion, the threshold utilized when receiving with the second antenna is defined as THR2. As defined in step 440—the processor circuitry may sample the signal over time and calculate an average SER ($SER_{avg}$) over a period of time, T2, which commences if the SER rises above THR2.

If the average symbol error rate ($SER_{avg}$) over the time interval T2 is less than or equal to SER2, the system continues reception via the second antenna. Accordingly, if at step 444, the $SER_{avg}$ is less than or equal to SER2 over the time interval T2, then the operation returns to step 428 and the operation continues in the manner described above.

It is contemplated that this method calculates an average error rate, i.e. an error rate over a specified period of time, before a comparison is made to a specific threshold. As T1 or T2 increases, this algorithm provides the advantage of reducing a momentary change in error rate from initiating a switching operation. This eliminates hunting between antennas for a desired signal in the event neither antenna will yield a signal having a SER below the threshold.

It is further contemplated that the signal selection algorithm may measure the percentage of samples that fall within a specified ranges above the threshold. These percentage values can also be used as a decision variable to control switching. For example, the percentage of samples that falls above the threshold may be tabulated over a specified period of time.

Figure 5:
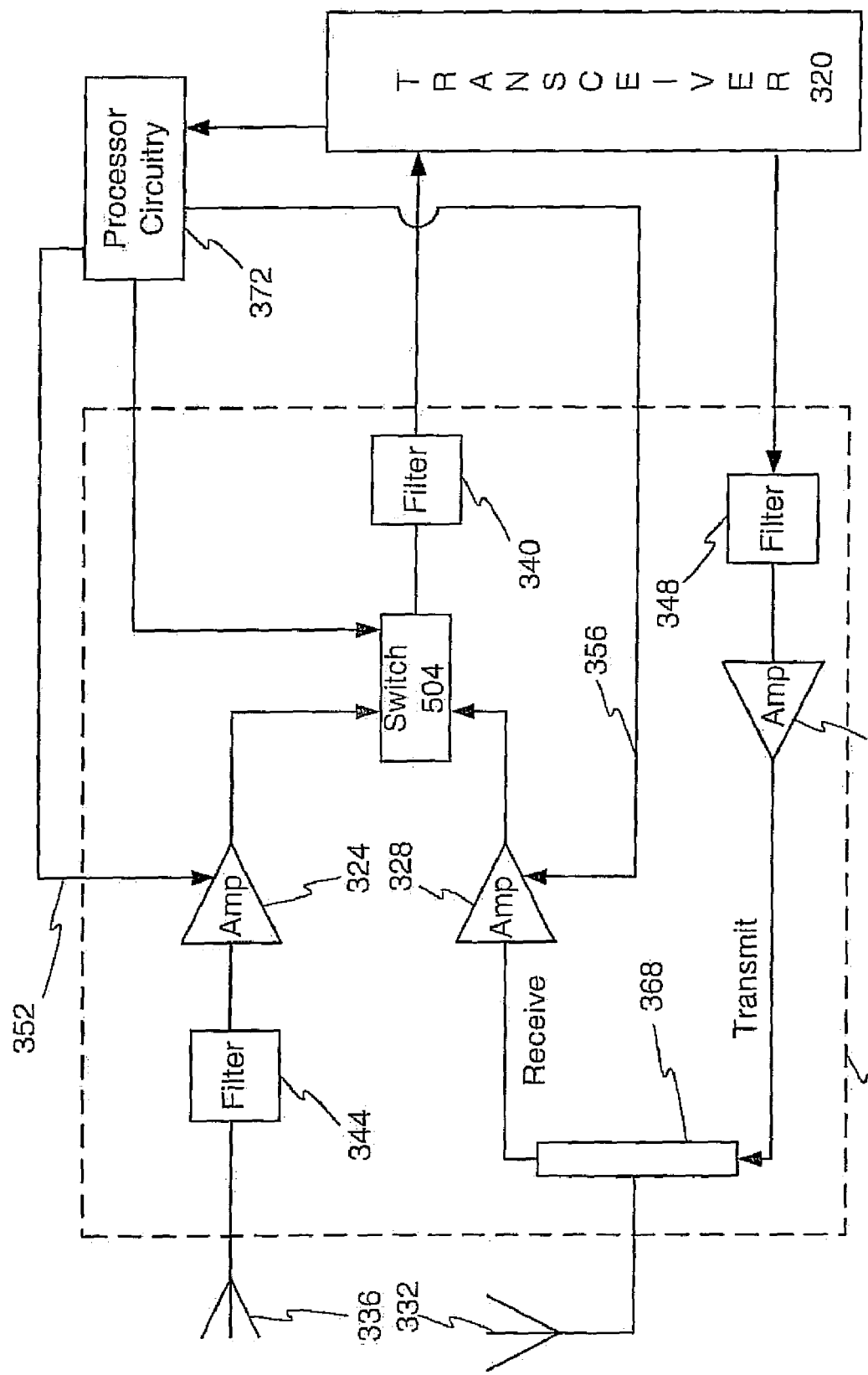
FIG. 5 illustrates a block diagram of an alternative embodiment having a switching element.

Another embodiment, shown in FIG. 5, is similar to that of FIG. 3, but employs a switch 504, instead of a signal node, connected to the output of the low noise amplifiers 324, 328. With regarding to FIG. 3 and FIG. 5, similar elements are identified with identical reference numerals. The switch 504 comprises circuitry responsive to the control signals provided via conductors 352, 356 from the processor circuitry 520. In this embodiment, it is contemplated the switch 504 provides a controlled mechanism to switch an output of the low noise amplifiers 324, 328 to the input of the filter 340. Although the control signals on conductors 352, 356 may provide adequate control of the outputs of the low noise amplifiers 324, 328, the use of the switch 504 may provide an added degree of control when the system selects the output of one low noise amplifier to the other. The switch 504 may comprise any electrical element capable of achieving or controlling connections between the input to the filter 340 and either the output of the low noise amplifier 324 or the output of the low noise amplifier 328. While the switch may introduce some amount of signal attenuation there is an added degree of control. In an alternative embodiment, the control lines 352, 356 are eliminated and the switch 504 is solely responsible for determining the signal provided to the transceiver 320.

Figure 6:
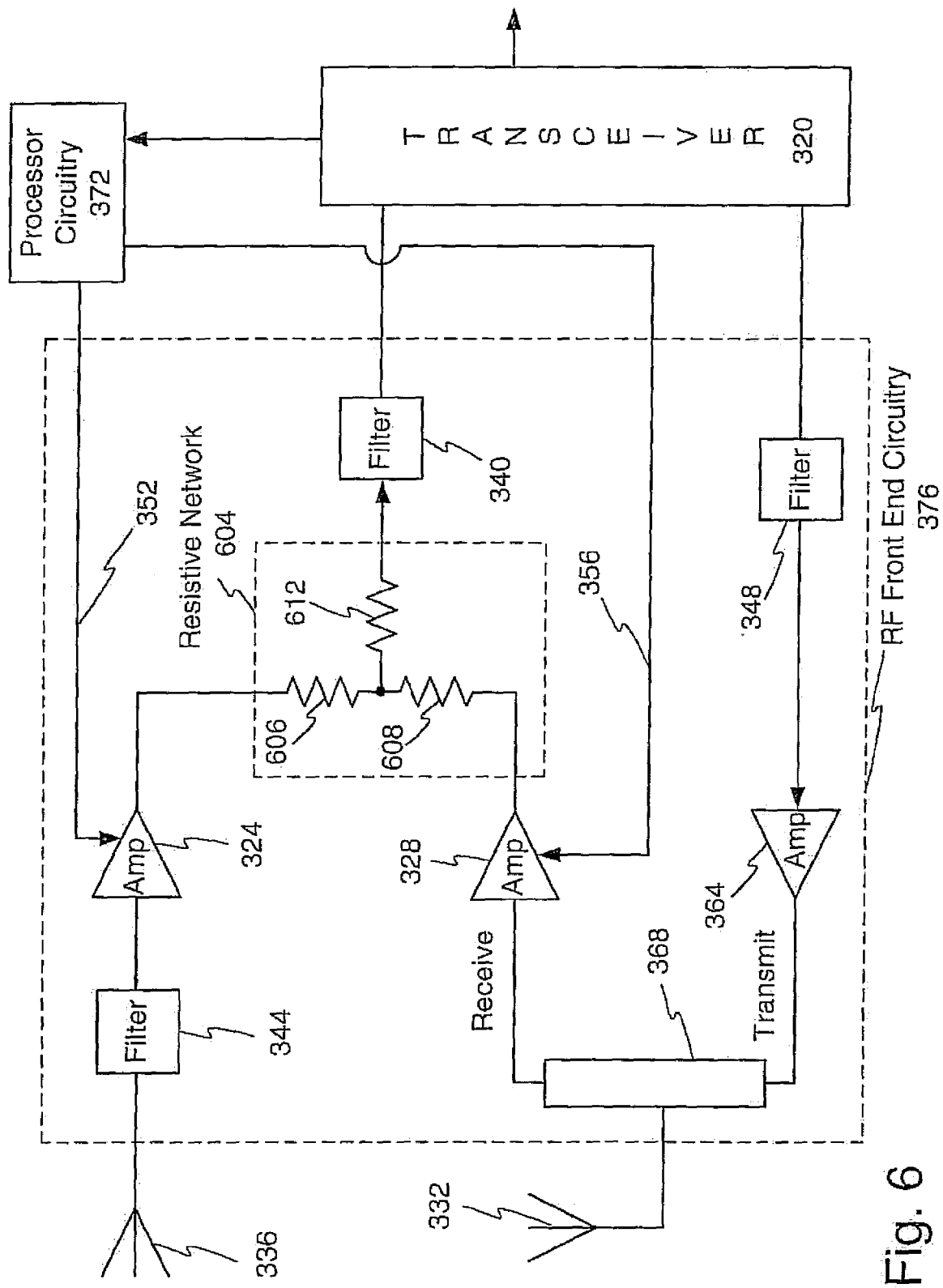
FIG. 6 illustrates a block diagram of an alternative embodiment having a resistive network.

FIG. 6 illustrates a block diagram of an alternative embodiment of the invention. FIG. 6 shares numerous similarities with FIG. 3 and, as a result, similar elements are identified with identical reference numerals. In this instance, the switch 504 described in FIG. 5, is replaced by a resistive network 604. In one example embodiment the resistive network 604 comprises three resistors 606, 608, 612, which connect the outputs of the low noise amplifiers 324, 328 to the input of the transceiver 320 via the filter 340. The low noise amplifiers 324, 328 in conjunction with the control signals on conductors 352, 356 operate as described previously in the text associated with FIG. 5. The values of the three resistors 606, 608, 612 are selected to maximize the SNR at the input of the transceiver 320. It is contemplated that resistive networks other than that shown may be used. Moreover, components other than resistors may be added to achieve desired operation.

Figure 7:
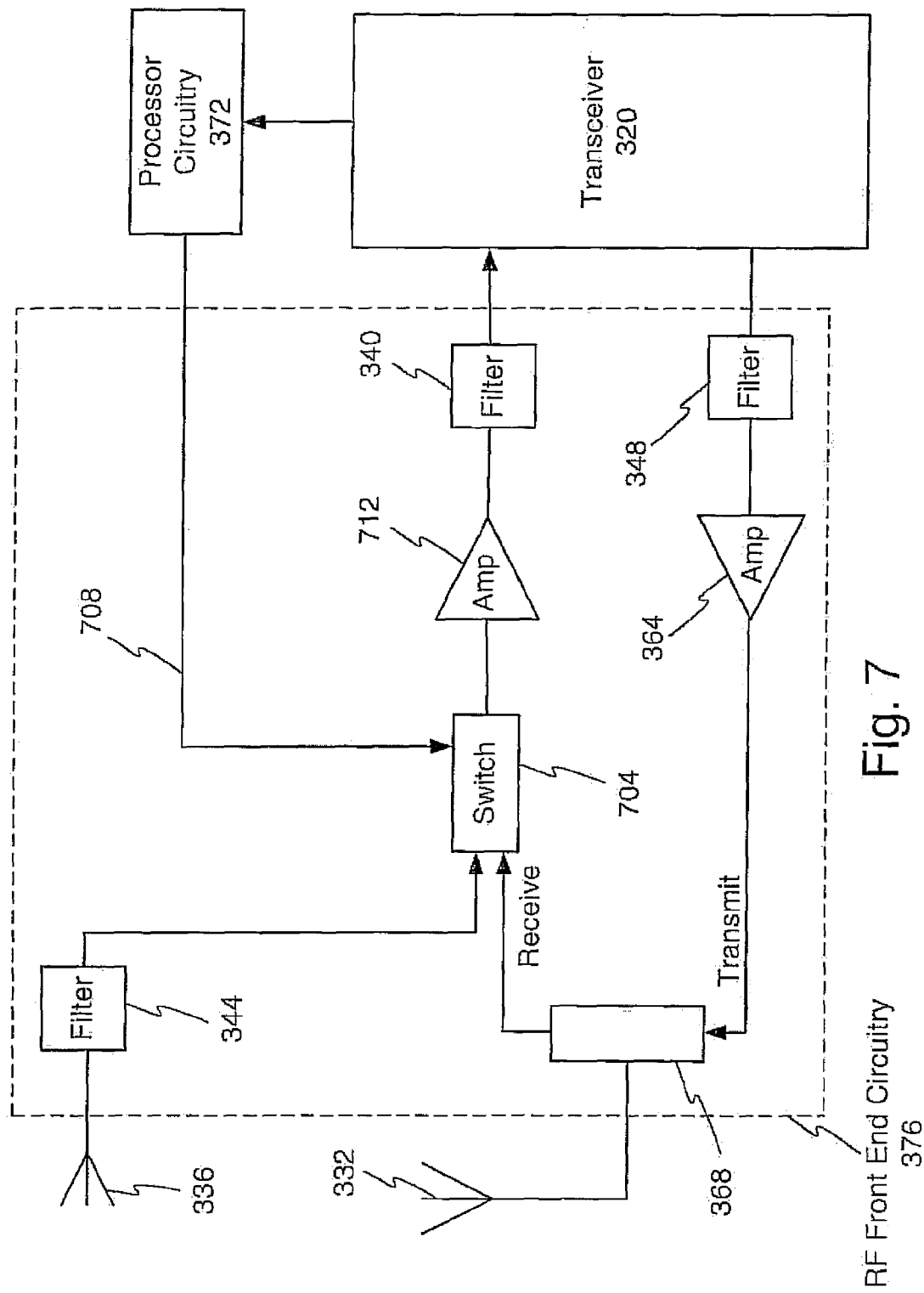
FIG. 7 illustrates a block diagram of an alternative embodiment having a switching element located on an antenna side of an amplifier.
Figure 8:
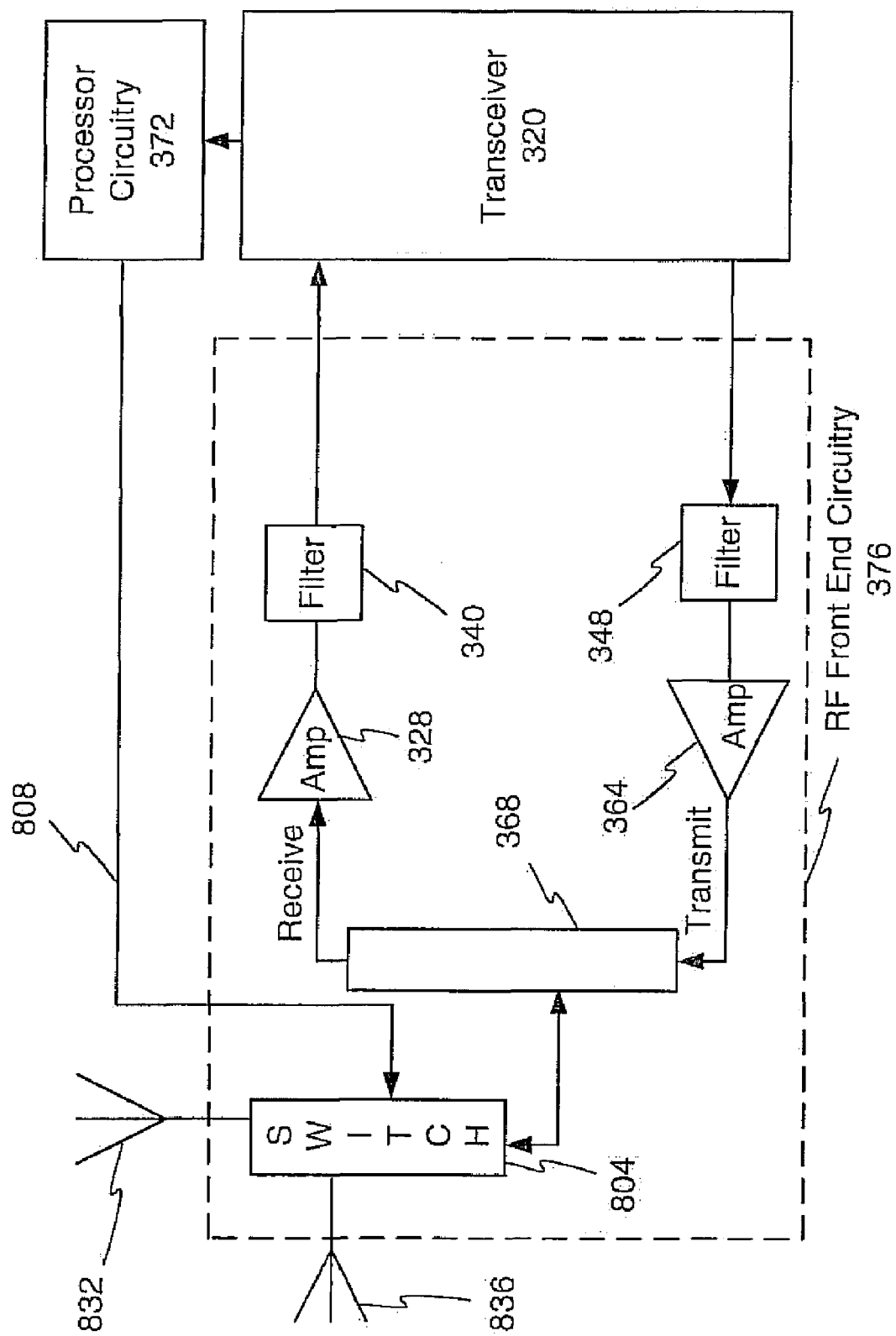
FIG. 8 illustrates a block diagram of an alternative embodiment having a switching element located an antenna side of a duplexer.

FIGS. 7 and 8 illustrate block diagrams of alternative embodiments of receiver systems with dual antennas such that the received signal is processed by an antenna switching element, switching system, or switching device prior to processing by the low noise amplifiers. FIG. 7 illustrates a block diagram of an alternative embodiment configured with an amplifier 712 located after an antenna selector switch 704. Portions of FIG. 7 are identical to portions of FIG. 3 and accordingly identical elements are referenced with identical reference numerals. The following discussion applies to the portions of FIG. 7 that differ from aspects described above. Collectively, the elements inside the dashed line comprise the RF front-end circuitry 376. As shown, the antenna 332 connects to the duplexer 368, which in turn connects to the amplifier 364 as described above. The amplifier 364 connects to the filter 348, which in turn connects to the transceiver 320.

The duplexer 368 also connects to a switch 704. The switch 704 receives signals from the filter 344 via the second antenna 336. In this embodiment, the output of the switch 704 connects to a low noise amplifier 712. In contrast to previous embodiments, the switch 704 is located on the antenna side of the amplifier 712. As in previous embodiments, the switch 704 receives control input from the processor circuitry 372, in this embodiment, via conductor 708. The low noise amplifier 712 amplifies the signal to an acceptable level and outputs the amplified signal to the filter 340, which in turn delivers the received signal to the transceiver 320.

In operation, the processor circuitry 372 analyzes an error rate of the received signal. The processor circuitry 372 may calculate the error rate or the transceiver 320 may provide the error rate to the processor circuitry. The processor circuitry 372 responds to the error rate by providing a control signal to the switch 704. The control signal provided via conductor 708 to the switch 704 forces the switch to direct: a signal from either the first antenna 332 or second antenna 336 to the transceiver 320. The switch 704 is functionally similar to the switch 504 described earlier in FIG. 5. The switch 704 may comprise any electrical element capable of controlling the connection between the input of low noise amplifier 712 to either the output of the filter 344 or the output of the duplexer 368. The algorithm applied by the processor circuitry 372 may be generally similar to that described previously in conjunction with FIG. 4. As an advantage to the configuration shown in FIG. 7, only a single amplifier 712 is required. This may reduce the cost, size, and power consumption of the device while still providing the advantage of a dual antenna approach.

FIG. 8 illustrates a block diagram of an alternative embodiment configured with an antenna switching element 804 located between the two or more antennas 832, 836 and a duplexer 368. Portions of FIG. 8 are identical to FIG. 3 and accordingly, identical elements are referenced with identical reference numerals. The following discussion applies to the portions of FIG. 8 that differ from aspects described above. Collectively, the elements inside the dashed line comprise the RF front-end circuitry 376. Antennas 832, 836 connect to the switch 804 as shown. It is contemplated that the antennas 832, 836 are configured to be at least partially orthogonal to gain the benefits of different reception characteristics. The switch 804 may comprise any electrical element capable of connecting the input of the duplexer 368 to either the output of the antenna 832 or the output of the antenna 836.

As in previous embodiments, the switch 804 receives control input from the processor circuitry 372, in this embodiment, via conductor 808. The output from the switch feeds into the duplexer 368. The duplexer 368 isolates the received signal and transmits it to the low noise amplifier 328. The signal is amplified and forwarded to the filter 340 where unwanted frequency components are removed. The filter 340 outputs the signal to the transceiver 320 for further processing as described above.

In operation, the processor circuitry 372 determines an error rate of the received signal that is generated by the transceiver 320. The processor circuitry 372 responds to the error rate by providing a control signal to the switch 804. The control signal provided via conductor 808 to the switch 804 selects the received signal from either antenna 832 or antenna 836. The switch 804 may be functionally similar to the switches described earlier. The switch selection algorithm applied by the processor circuitry 372 may be similar to that described previously in FIG. 4.

As an advantage of the embodiment illustrated in FIG. 7 the filter 344 (FIG. 7) is eliminated. This may reduce the cost and size of the unit. Furthermore, the embodiments described herein reduce the error rate associated with a received signal by selecting one of two or more signals for processing. To reduce power consumption, active devices in the signal path and not in use may be powered down by control signals generated from the processor circuitry 372.

While various embodiments of the invention have been described, it will be apparent to those of ordinary skill in the art that many more embodiments and implementations are possible that are within the scope of this invention. It is contemplated that the, invention can be implemented in a plurality of other environments, such as any environment where an improvement in the received SNR might provide benefit in the operation of a wireless communication device. Further, it will be understood that the above described arrangements of apparatus and the methods there from are merely illustrative of applications of the principles of this invention and many other apparatus and methods may be implemented without departing from the sprit and scope of the invention as defined in the claims.

What is claimed is:

1. An apparatus for receiving a signal at a wireless communication device, the apparatus comprising:
    a first antenna;
    a second antenna;
    a first amplifier connected between the first antenna and a node, the first amplifier configured to provide, when enabled, an first amplified signal at the node based on a signal received through the first antenna;
    a second amplifier connected between the second antenna and the node, the second amplifier configured to provide, when enabled, a second amplified signal based on a signal received through the second antenna; and
    a processor configured to receive the amplified signals and present control signals to the first amplifier and the second amplifier to selectively enable or disable the first amplifier and the second amplifier.

2. The apparatus of claim 1, further comprising a resistive network between the amplifiers and the processor.

3. The apparatus of claim 1, further comprising a switch between the amplifiers and the processor.

4. The apparatus of claim 1, wherein the first antenna is at least partially orthogonal to the second antenna.

5. An apparatus for switching between a first input and a second input within a wireless communication device configured to receive a signal comprising:
    a first antenna for receiving a signal;
    a second antenna for simultaneously receiving the signal, and substantially disposed in an orthogonal spatial relationship to the first antenna;
    a first amplifier having a first amplifier input coupled to the first antenna, a first amplifier control input, and a first amplifier output;
    a second amplifier having a first amplifier input coupled to the second antenna, a second amplifier control input, and a second amplifier output, with the second amplifier output coupled to the first amplifier output;
    a transceiver having an input coupled to the first amplifier output and the second amplifier output, and producing a transceiver output selectively derived from the first amplifier output and the second amplifier output; and
    a processor having a processor input coupled to the transceiver output, and configured to selectively analyze the first amplifier output, and the second amplifier output and generating a first amplifier control signal coupled to the first amplifier control input and a second amplifier control signal coupled to the second amplifier control input so that either the first amplifier output may be coupled to the transceiver, or the second amplifier output may be coupled to the transceiver.

6. The apparatus for switching between a first input and a second input within a wireless communication device configured to receive a signal of claim 5, in which the first antenna is a whip antenna.

7. The apparatus for switching between a first input and a second input within a wireless communication device configured to receive a signal of claim 5, in which the second antenna is an internal antenna.

8. The apparatus for switching between a first input and a second input within a wireless communication device configured to receive a signal of claim 5, in which the first amplifier control signal is for selectively enabling and disabling the first amplifier output, and the second amplifier control signal is for selectively enabling and disabling the second amplifier.

9. The apparatus for switching between a first input and a second input within a wireless communication device configured to receive a signal of claim 5, in which the apparatus for switching between a first input and a second input within a wireless communication device forms a receive path.

10. The apparatus for switching between a first input, and a second input within a wireless communication device configured to receive a signal of claim 5, in which a diplexer is disposed between the second antenna and the second amplifier input.

11. The apparatus for switching between a first input and a second input within a wireless communication device configured to receive a signal of claim 5, in which a filter is disposed between a combined first amplifier output and the second amplifier output, and the transceiver input.

12. The apparatus for switching between a first input and a second input within a wireless communication device configured to receive a signal of claim 5, in which the transceiver output is a demodulated baseband signal.

13. The apparatus for switching between a first input and a second input within a wireless communication device configured to receive a signal of claim 5, in which the processor analyzes the transceiver output and further comprises a second processor coupled to an output of the first processor, and generates the first amplifier control signal and the second amplifier control signal.

14. The apparatus for switching between a first input and a second input within a wireless communication device configured to receive a signal of claim 5, further comprising a switch disposed between the first amplifier output and the second amplifier output.

15. The apparatus for switching between a first input and a second input within a wireless communication device configured to receive a signal of claim 5, further comprising a resistive device disposed between the first amplifier output and the second amplifier output.

16. The apparatus for switching between a first input and a second input within a wireless communication device configured to receive a signal of claim 5, in which the first amplifier and the second amplifier are low noise amplifiers.

17. The apparatus for switching between a first input and a second input within a wireless communication device configured to receive a signal of claim 5, in which analysis of the first amplifier output, and the second amplifier output accomplished utilizing machine readable code stored in a processor memory coupled to the processor.

18. The apparatus for switching between a first input and a second input within a wireless communication device configured to receive a signal of claim 5, in which the first amplifier control signal and the second amplifier control signal change state over a period of time sufficient to prevent an excessive phase step and demodulation error.

19. The apparatus for switching between a first input and a second input within a wireless communication device configured to receive a signal of claim 5, in which either the first amplifier output is coupled to the transceiver, or the second amplifier output is coupled to the transceiver at any given time.

* * * * *